2 Sheets—Sheet 1.

W. L. COVEL.
SAW-SHARPENING MACHINE.

No. 172,092. Patented Jan. 11, 1876.

WITNESSES:
W. W. Hollingsworth
Edw. W. Byrn.

INVENTOR:
Wm. L. Covel
BY
ATTORNEYS.

2 Sheets—Sheet 2.

W. L. COVEL.
SAW-SHARPENING MACHINE.

No. 172,092. Patented Jan. 11, 1876.

WITNESSES:
W. W. Hollingsworth
John A. Kennon

INVENTOR:
W. L. Covel
BY
[signature]
ATTORNEYS.

UNITED STATES PATENT OFFICE.

WILLIAM L. COVEL, OF BELOIT, WISCONSIN.

IMPROVEMENT IN SAW-SHARPENING MACHINES.

Specification forming part of Letters Patent No. 172,092, dated January 11, 1876; application filed August 23, 1875.

*To all whom it may concern:*

Be it known that I, WILLIAM L. COVEL, of Beloit, in the county of Rock and State of Wisconsin, have invented a new and Improved Saw-Sharpening Machine; and I do hereby declare that the following is a full, clear, and exact description of the same, reference being had to the accompanying drawing forming a part of this specification, in which—

Figure 1:
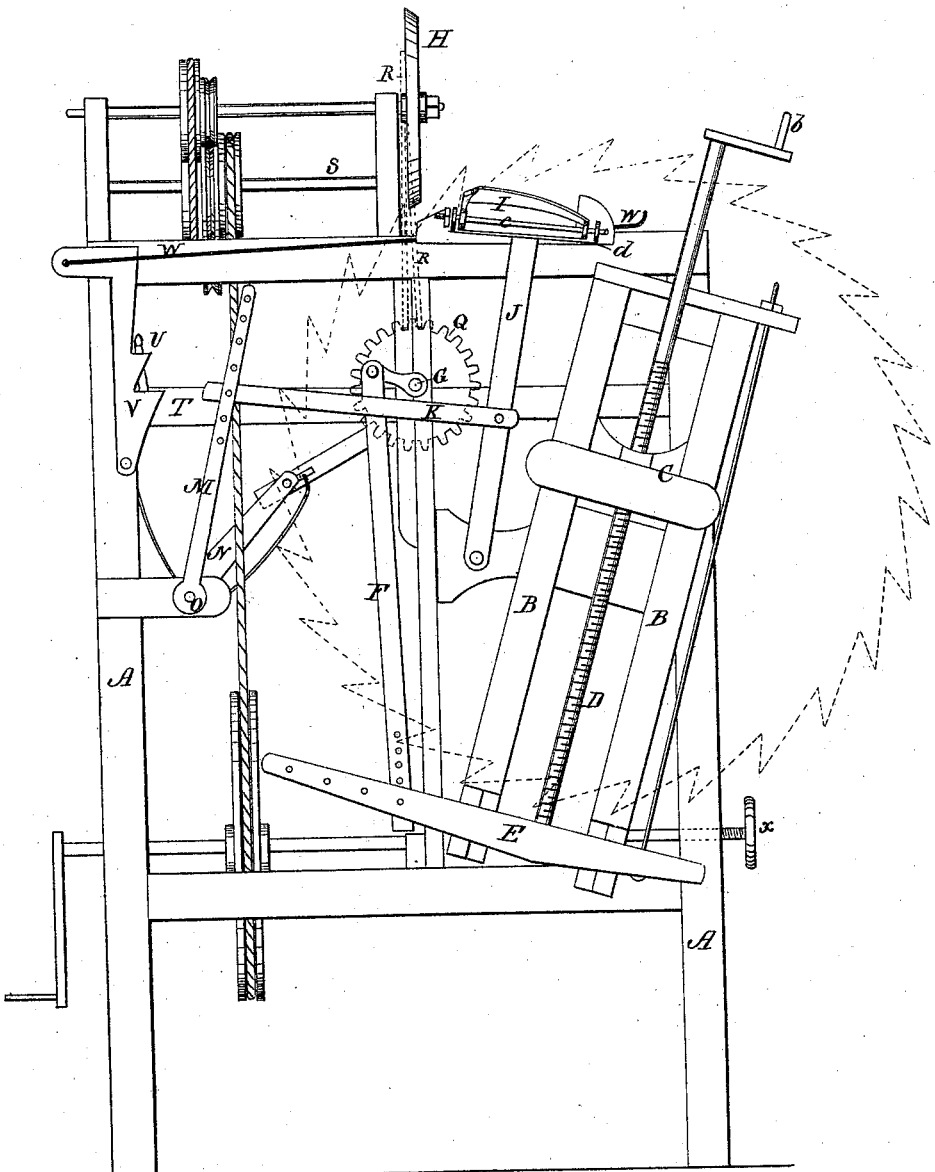
Figure 2:
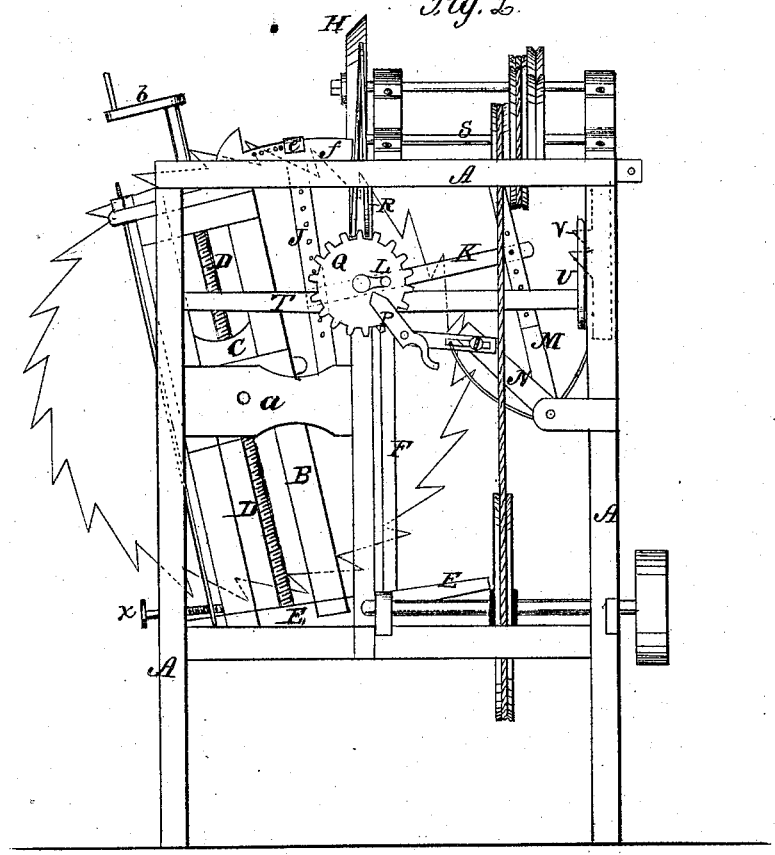
Figure 3:
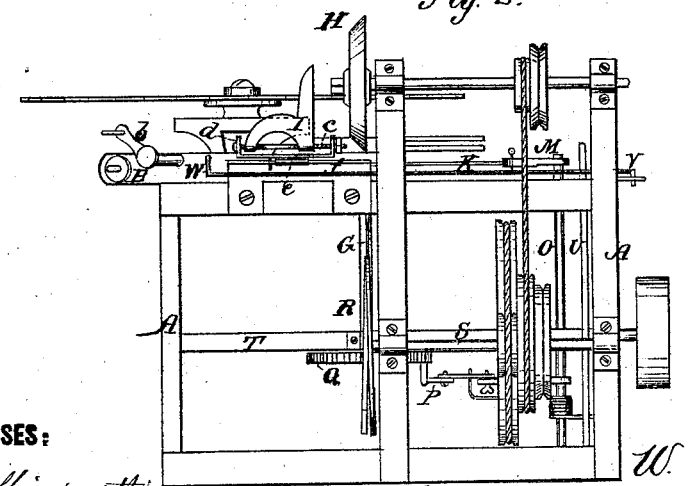

Figure 1 is a vertical front elevation with the saw-plate removed. Fig. 2 is a vertical rear elevation; Fig. 3, a plan view.

The object of this invention is to provide a machine for sharpening mill-saws, which, after being once adjusted, shall automatically sharpen all of the teeth of the saw without further attention, and be made to stop operating upon or cease to sharpen the saw at any desired point. It consists in an adjustable frame, pivoted in the center, and having parallel guideways, in which moves a sliding block, to which the saw is detachably fastened. Through said sliding block passes a screw-threaded rod, whereby the block and saw may be adjusted in the frame, and to the lower end of this rod is attached a lever, connected through a pitman with the crank of a slowly-revolving shaft, by means of which the saw and block are together elevated and made to approach a revolving emery-wheel each time a tooth is sharpened. At the top of the main frame is a pivoted latch-feed, controlled by a guide, which latch-feed moves the saw by engaging with the face of the saw-teeth for the purpose of bringing the teeth successively in position for the emery-wheel. The said feed is fastened to the top of a lever and is actuated through a pitman and rock-shaft with double cranks and a tappet by a crank upon the slowly-revolving shaft aforementioned. This shaft is journaled in a movable bar, supported at one end by a lever, which lever is provided with a tripping device for throwing the pinion of the shaft out of gear to stop the motion of the feeding devices.

In the drawing, A represents the main frame of the machine, to which is pivoted at *a* the adjustable frame B. Said frame B is provided with parallel guideways, in which moves a sliding block, C, to which the saw is attached. Through said sliding block passes a screw-threaded rod, D, having at the top a crank, *b*, by means of which the position of the block in the frame may be changed and different sized saws adjusted to the sharpening-wheel. The lower end of the rod D is attached to a lever, E, which is elevated and depressed alternately through an adjustable pitman, F, attached to the crank of a slowly-revolving shaft, G, for the purpose of raising the block C and the saw attached thereto, so as to bring the teeth in contact with the emery-wheel H. I is a pivoted latch-feed, which moves with a reciprocating motion, and, by bearing against the face of the saw-teeth, feeds the saw to the grinding-wheel one tooth at each movement. Said latch-feed is pivoted upon a horizontal screw-threaded bolt, *c*, in the head *d*, which gives it an adjustment in said head, and is provided with a slide, *e*, moving over guide *f*, the latter being provided with holes for a stop-pin, to determine the throw of the latch and head. The said head carrying the latch is attached to the upper end of a lever, J, which is reciprocated by the pitman K, which latter is operated by a crank, L, upon the shaft G through cranks M and N, the rock-shaft O, and the adjustable tappet P. The connections of the pitman with the lever J and crank M are made adjustable, as is also the connection of the tappet with the crank N, the object of said adjustments being to qualify and regulate the feed according to the particular requirements of the case. The end of said tappet is made reversible, being pivoted in the middle upon a binding-screw and having one end straight and the other curved to correspond to the particular shape of the tooth. Q is a pinion upon the shaft G, which gears with, and is slowly revolved by, a worm-wheel, R. Said wheel is attached to the same shaft S with the driving-pulley, which shaft is geared with and actuates the shaft of the grinding emery-wheel. T is a movable bar, in which is journaled the shaft G, carrying the pinion, one end of which bar is supported in a lever, U, which may be raised or lowered, so as to throw the said pinion out of gear with the worm-wheel and stop the feeding devices. V is a tripping device, having projections, upon which the end of lever U rests; and W is a rod attached to said device, which is arranged to be struck by a clamp attached to the saw-plate at any given time, so as to discontinue the operation of sharpening at any given point.

The operation of this machine is as follows: The saw is first fastened to the block, and the frame B adjusted upon its pivot at $a$ to the emery-wheel, according to the size of the saw, through a binding-screw, $x$, and the block then adjusted in said frame by the screw-threaded rod passing therethrough. Motion being now imparted to the shaft G, the crank of the latter lifts pitman F, lever E, and with it the rod D, block and saw, bringing the teeth of the latter into position beneath the grinding-wheel. As the saw descends the crank L of the shaft G strikes the tappet, and, moving the rock-shaft, pitman, and feed-lever, carries the latch-wheel against the face of the saw-tooth and rotates the saw the distance of one tooth, the latch-feed being carried back into position for the next movement either by the weight of the feeding devices or a spring. The operation of sharpening the saw is thus rendered automatic, and if the workmen be called away during the operation a clamp may be affixed to the saw-plate at the finishing-point, which clamp will, when it passes around, strike the rod W, and, by throwing the working parts out of gear, stop the operation at the proper point.

The machine, as thus described is equally as well adapted for straight as for circular saws.

When circular saws are to be operated upon, the saw is pivoted to an attachment to the sliding block, and when straight saws are sharpened they are mounted upon a carriage attached to said block, the mode of feeding and sharpening being the same in both cases.

Having thus described my invention, what I claim as new is—

1. The combination of the latch-feed I, the screw-threaded pivot-bolt $c$, and a suitable guide, as and for the purpose described.

2. The combination of the sliding block, the screw-rod D, lever E, pitman F, and crank-shaft G, as and for the purpose described.

3. The combination, with the latch-feed, of the pivoted lever J, pitman K, rock-shaft O, cranks M N, tappet P, and crank L, as and for the purpose described.

4. The combination, with the pinion Q and the worm-wheel, of the movable bar T, lever U, tripping device V, and rod W, substantially as and for the purpose described.

The above specification of my invention signed by me this 17th day of August, 1875.

W. L. COVEL.

Witnesses:
SOLON C. KEMON,
CHAS. A. PETTIT.